United States Patent [19]
Forgacs

[11] Patent Number: 5,303,685
[45] Date of Patent: Apr. 19, 1994

[54] HOMOGENIZING FUEL PICKUP SYSTEM

[75] Inventor: Robert L. Forgacs, Dearborn Heights, Mich.

[73] Assignee: Ford Motor Company, Dearborn, Mich.

[21] Appl. No.: 857,567

[22] Filed: Mar. 23, 1992

[51] Int. Cl.$^5$ .......................................... F02M 37/04
[52] U.S. Cl. .............................. 123/510; 137/625.41; 137/579; 123/514
[58] Field of Search ............ 137/558, 578, 579, 616.7, 137/625.41; 123/509, 514, 510, 512, 494

[56] References Cited

U.S. PATENT DOCUMENTS

| | | | |
|---|---|---|---|
| 222,140 | 12/1879 | Lindsay | 137/578 |
| 1,135,139 | 4/1915 | Rankin | 137/578 |
| 1,203,578 | 11/1916 | Brooks . | |
| 2,207,378 | 7/1940 | Hinsch | 137/578 |
| 3,031,011 | 4/1962 | Dawson | 137/579 |
| 3,162,235 | 12/1964 | Capehart | 137/579 |
| 3,301,310 | 1/1967 | Sperber | 137/579 |
| 3,390,698 | 7/1968 | Carmichael et al. | 137/567 |
| 4,546,750 | 10/1985 | Brunell et al. | 123/514 |
| 4,706,630 | 11/1987 | Wineland et al. | 123/478 |
| 4,878,518 | 11/1989 | Tuckey | 123/510 |
| 4,890,644 | 11/1990 | Hoeptner | 137/625.41 |
| 5,111,844 | 5/1992 | Emmert | 123/514 |
| 5,115,837 | 5/1992 | Tupper | 137/625.41 |
| 5,146,901 | 9/1992 | Jones | 123/509 |

FOREIGN PATENT DOCUMENTS

| | | | |
|---|---|---|---|
| 0256975 | 10/1990 | Japan | 137/625.41 |
| 731965 | 6/1955 | United Kingdom | 137/578 |
| 865647 | 4/1961 | United Kingdom | 137/625.41 |

OTHER PUBLICATIONS

Lawson et al, Oxygen Sensor Equipped Engine Operation of Phase Separated Methanol/Gasoline Blends, 5th International Symposium on Automotive Propulsion Systems, published by the U.S. Department of Energy (Conf-800419), Oct., 1980.

Primary Examiner—Carl S. Miller
Attorney, Agent, or Firm—Roger L. May; Peter Abolins

[57] ABSTRACT

A homogenizing fuel delivery system is provided for drawing fuel substantially equally from each layer of fuel in a vehicle fuel tank, and delivering this fuel to the vehicle's engine. In this manner, the composition of the fuel delivered to the engine approximates the average composition of fuel in the fuel tank.

20 Claims, 5 Drawing Sheets

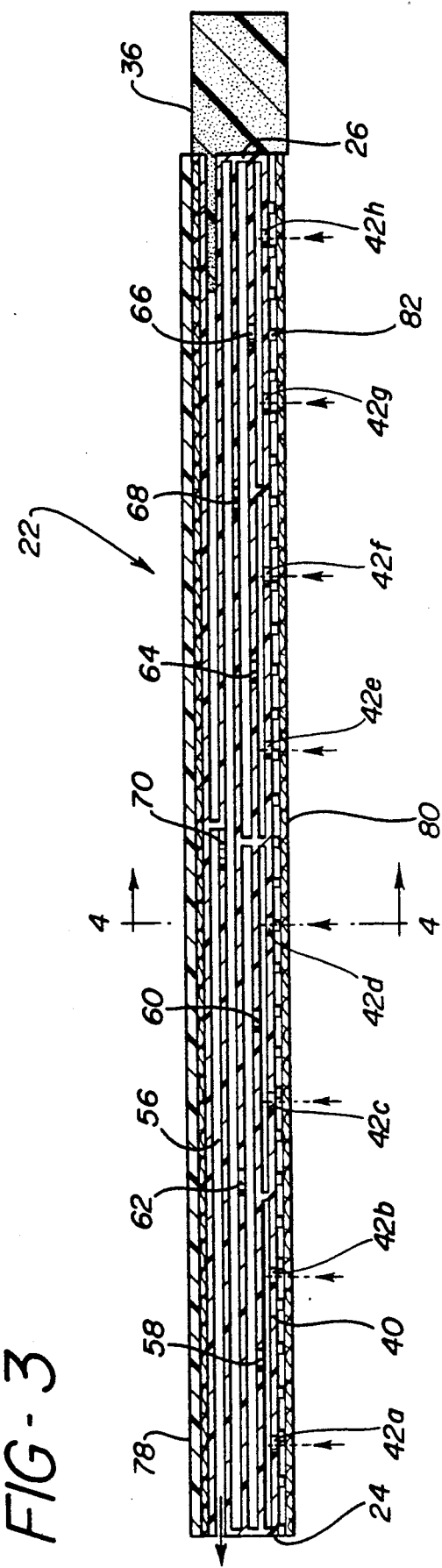
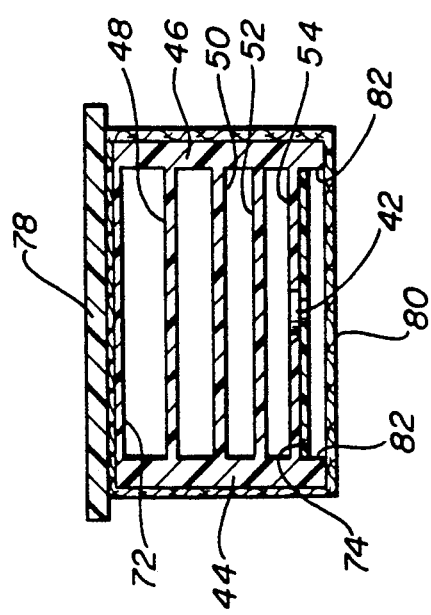
FIG-3
FIG-4

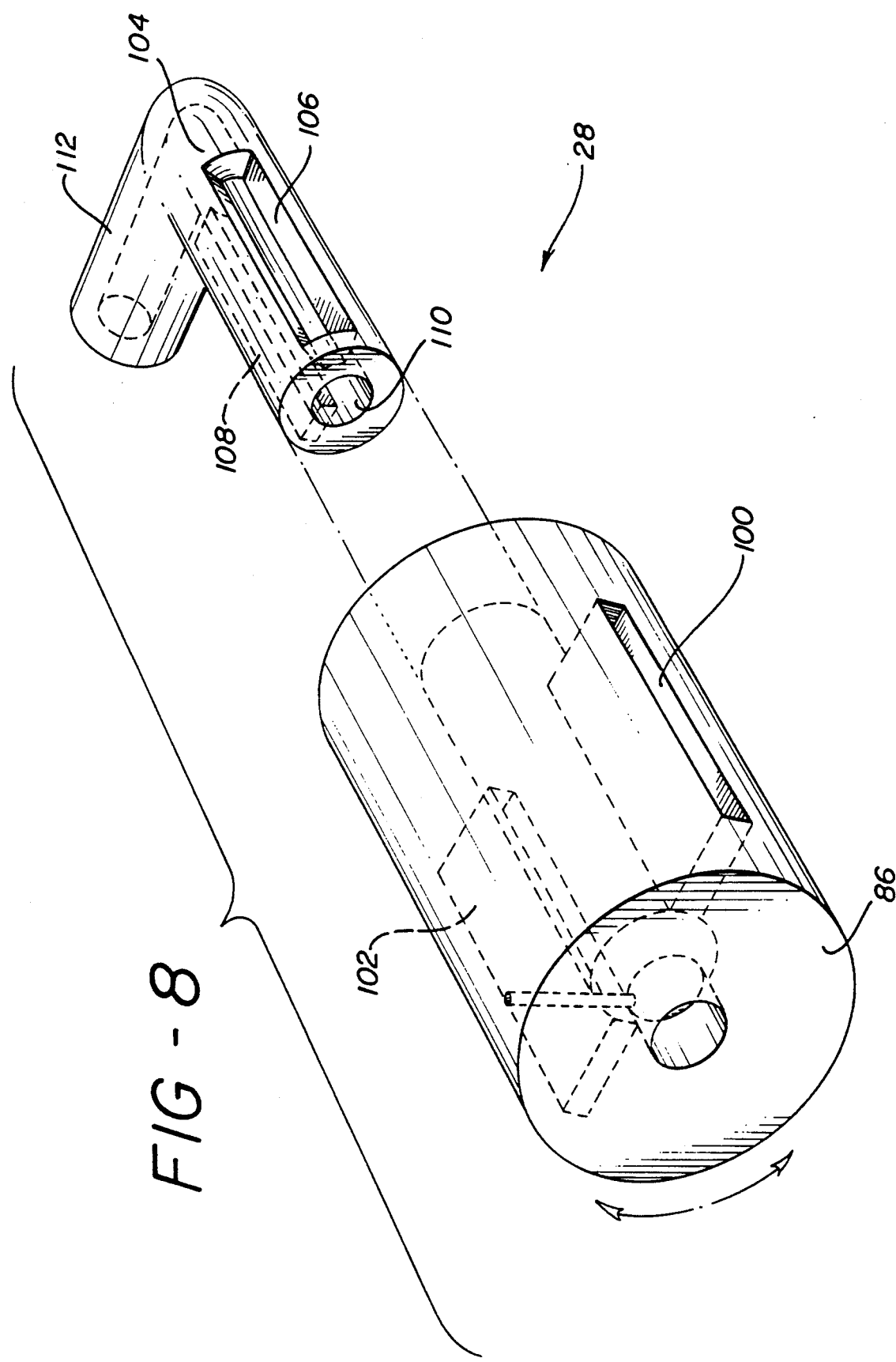

HOMOGENIZING FUEL PICKUP SYSTEM

BACKGROUND OF THE INVENTION

The present invention relates to an apparatus for delivering fuel from a fuel tank to an engine in a motorized vehicle. More particularly, it relates to an apparatus for delivering fuel from a fuel tank to an engine in a motorized vehicle in such a manner that the fuel drawn from the vehicle's fuel tank approximates the average fuel composition of the fuel in the main fuel tank, even if the fuel is stratified.

It is well known that ever tighter emissions regulations and petroleum depletion have prompted research into the feasibility of using alternative fuels in motorized vehicle engines. Currently, ethanol/gasoline and methanol/gasoline mixtures are among the alternative fuel possibilities being considered.

Alternative fuel mixtures exhibit physical properties and performance characteristics which are different from pure gasoline, including dissimilar combustion burn rates, volumetric energy content, vapor pressures, octane ratings, and heats of vaporization. The operating parameters of vehicle engines utilizing alternative fuels must be adjusted to accommodate such differences in order for the engines to operate efficiently. The operating parameters which must be adjusted include the air bypass, fuel flow, spark timing, and air/fuel ratio.

The aforementioned adjustments can be made automatically by an engine control computer. Engine control computers are well known and are commonly used in vehicles. See, for example, U.S. Pat. No. 4,706,630 to Wineland et al. However, in order for an engine control computer to correctly make the requisite adjustments, the instantaneous composition of the fuel being burned in the engine must be known by the computer. To the extent that fuel composition information sent to the engine control computer differs from the actual composition of fuel being burned in the engine, adjustments made to the engine will be improper. Improper engine adjustments, in turn, can result in poor engine performance and excess emissions due to incomplete combustion. Thus, a close correlation between the composition of fuel actually being burned in an engine and that which is made known to the engine control computer is needed to facilitate the use of alternative fuel use in motorized vehicle engines.

Current means of drawing fuel from the fuel tank of a motorized vehicle involve devices which either draw fuel from the top layer of fuel in the fuel tank or from the bottom of the fuel tank. For example, U.S. Pat. No. 1,203,578 to Brooks discloses a delivery pipe attached at one end to a float and strainer combination for drawing fuel from the upper portion of fuel within a fuel tank. The float keeps the strainer at the top surface of fuel in the tank so that only fuel from the top surface is drawn through the strainer.

U.S. Pat. No. 3,390,698 to Carmichael et al. discloses a vehicle with an auxiliary fuel tank which receives fuel from the bottom of a main fuel tank. The auxiliary tank is provided with an outlet fuel line having small bores to restrict fuel flow to the vehicle's engine when the only fuel remaining in the vehicle is that contained within the auxiliary tank. As the fuel level in the auxiliary tank drops, the number of orifices available for fuel delivery to the engine become fewer and fewer so that the top speed of the vehicle becomes progressively lessened. In addition, the bores which are exposed above the fuel level in the auxiliary tank allow air to be ingested into the vehicle's engine which causes the engine to sputter. In this manner, the driver is reminded to refuel the vehicle.

U.S. Pat. No. 4,546,750 to Brunell et al. discloses a vehicle fuel tank which has a filter at the bottom thereof and a secondary reservoir disposed above the filter. Fuel is drawn from the interior of the filter. The secondary reservoir is filled by a fuel return line from the vehicle engine. An inertia responsive valve is provided between the reservoir and the filter to allow fuel to pass from the reservoir to the filter when the vehicle undergoes acceleration. In this manner, fuel starvation is prevented during acceleration.

Because such traditional fuel drawing devices draw fuel exclusively from the top layer of fuel in a fuel tank or from the bottom layer, only that layer of fuel from which the pickup device is drawing will be sent to the engine. In the event that the fuel consists entirely of one component, the portion of fuel sent to the engine will be representative of the fuel in the tank. In this instance, existing fuel drawing devices would be adequate. However, in other situations where the fuel either consists of multiple components, such as combinations of gasoline, methanol and ethanol, contains various fuel additives, or contains water, the composition of each layer of fuel in the fuel tank may differ. The condition in which the composition of each layer differs, known as stratification, generally occurs when the vehicle has been stationary for a period of time or after the vehicle has been refueled with a fuel having a different composition than the fuel initially in the tank. In this regard, the lower the temperature or the higher the water content in the fuel, the greater will be the likelihood that a condition of stratification will occur. During a condition of stratification, a fuel drawing device of the prior art will draw fuel from only one layer, thereby sending a portion of fuel to the engine which differs from the average fuel composition in the fuel tank.

For example, with a stratified fuel consisting of 85% methanol and 15% gasoline in a fuel tank, the higher density methanol will tend to settle towards the bottom of the tank while the gasoline will collect at the upper portion of the fuel in the tank. During the period of stratification, a surface-drawing fuel pickup device will send fuel consisting mostly of gasoline to the engine, while a bottom-drawing device will send a largely methanol-laden fuel. This situation can be problematic in several respects.

As is well known, in-line fuel sensors are commonly used to convey to a vehicle engine control computer the composition of fuel being sent to the vehicle's engine. Agitation of the fuel by vehicle motion or by action of the fuel pump will cause the composition of each layer of fuel to change over a period of time until the fuel is fully mixed. In addition, with a bottom drawing fuel pickup, fuel consumption will cause the composition of the bottom layer of fuel in the fuel tank to continuously change until full mixing occurs. Both of these events will result in continuously differing compositions of fuel being sent to the vehicle's engine. Due to the distance between the fuel sensor and the engine, the fuel composition information being sent to the engine control computer will differ from the composition of fuel actually being introduced into the engine. The result will be improper engine adjustments being made by the engine control computer during the period between stratification and full mixing.

A similar problem can occur due to the fact that, at startup, the composition of fuel in the fuel injector header and in the fuel lines between the fuel pump and the header will be different from the composition of fuel at the particular layer of fuel from which a surface or bottom drawing fuel pickup system will take fuel. Again, the composition of fuel being introduced into the engine will continuously vary and the distance between the fuel sensor and the engine may result in erroneous adjustments being made to the engine by the engine control computer.

As an alternative to using a fuel sensor, a vehicle engine control computer can be informed of the composition of fuel in a vehicle by providing means to manually specify to the vehicle's engine control computer the composition of fuel being added during each refueling. The engine control computer can be programmed to use this information, along with the total quantity of fuel added to the fuel tank and the composition and quantity of fuel existing in the fuel tank prior to refueling, if any, to calculate the average fuel composition in the fuel tank following refueling. Such means are disclosed in my commonly-assigned U.S. application Ser. No. 07/832,459, filed Feb. 7, 1992, entitled "Fuel Specifying Apparatus," the disclosure of which is hereby incorporated by reference. As with the use of fuel sensors, stratification of the fuel could result in erroneous engine adjustments being made by the vehicle engine control computer with the system disclosed in application Ser. No. 07/832,459 inasmuch as the composition of the layer of fuel being instantaneously drawn by a surface or bottom drawing fuel pickup device may differ from the average fuel composition in the vehicle fuel tank. Since the engine control computer will have adjusted the vehicle engine parameters based upon the average composition of the fuel in the fuel tank, the fuel actually being introduced into the engine may be inefficiently combusted due to the fact that the engine adjustments could be improper for that fuel.

Accordingly, it is seen that a need exists in the art for a system for delivering fuel from a vehicle fuel tank in such a manner that the fuel being withdrawn approximates the average composition of the fuel in the tank. Such a need, if fulfilled, would facilitate the use of multicomponent, alternative fuels in motorized vehicles by allowing engines to operate efficiently on such fuels, resulting in maximum engine performance and minimum pollution.

SUMMARY OF THE INVENTION

That need is met by the present invention which provides a system for drawing fuel in approximately equal proportions from each layer of fuel in a vehicle fuel tank, and delivering this fuel to the vehicle's engine. In this manner, the composition of the fuel delivered to the engine closely approximates the average composition of fuel in the fuel tank.

The present invention generally provides a homogenizing fuel delivery system for a motorized vehicle having an engine and a fuel tank where the fuel tank has top, bottom, and side portions defining an internal chamber for containing fuel. As defined herein, fuel in the fuel tank is understood to contain a plurality of layers. Each layer may or may not be of the same composition, depending upon the type of fuel, the physical environment of the fuel, and whether or not the fuel has been fully mixed. The delivery system comprises means for drawing fuel substantially equally from substantially all of the layers of fuel contained within the fuel tank. The fuel drawing means includes a pivotal member having a first end and a second end. The first end is pivotably mounted inside of the fuel tank while the second end is provided with means for causing it to reside at the surface of the fuel in the fuel tank. The homogenizing fuel delivery system further comprises means for delivering fuel from the fuel drawing means to the engine.

Preferably, the fuel drawing means includes a valve positioned inside of the fuel tank. The valve is adapted to be in fluid communication with the fuel delivering means and with the pivotal member where the first end of the pivotal member is pivotably mounted to the valve. Generally, the pivotal member has a top surface and a bottom surface with the bottom surface having a plurality of orifices disposed along substantially the entire length thereof in order to draw fuel substantially equally from substantially all of the layers of fuel contained within the fuel tank.

The present invention may also include means for minimizing air intake by the pivotal member. Such means may include all or any one of a filter interposed between the orifices and the fuel, a perforated enclosure surrounding the pivotal member, or a planar wave-blocking member fixed to the top surface of the pivotal member. Additional features of the present invention include means for causing circulation of the fuel in the fuel tank, means for avoiding inadequate fuel flow to the engine when the motorized vehicle undergoes acceleration, and means for sensing the level of fuel in the fuel tank.

Accordingly, it is an object of the present invention to provide a system for delivering fuel from a vehicle fuel tank in such a manner that the fuel being withdrawn closely approximates the average composition of the fuel in the tank, thereby facilitating the use of multicomponent, alternative fuels in motorized vehicles.

These and other objects and advantages of the present invention will become apparent from the following detailed description, the accompanying drawings, and the appended claims.

BRIEF DESCRIPTION OF THE DRAWINGS

FIG. 3 is a cross sectional view of the pivotal member shown in FIG. 2 taken along lines 3—3.

FIG. 4 is a cross sectional view of the pivotal member shown in FIG. 3 taken along lines 4—4.

FIG. 8 is an exploded perspective view of the rotary valve shown in FIGS. 5-7.

DETAILED DESCRIPTION OF THE PREFERRED EMBODIMENT

Figure 1:
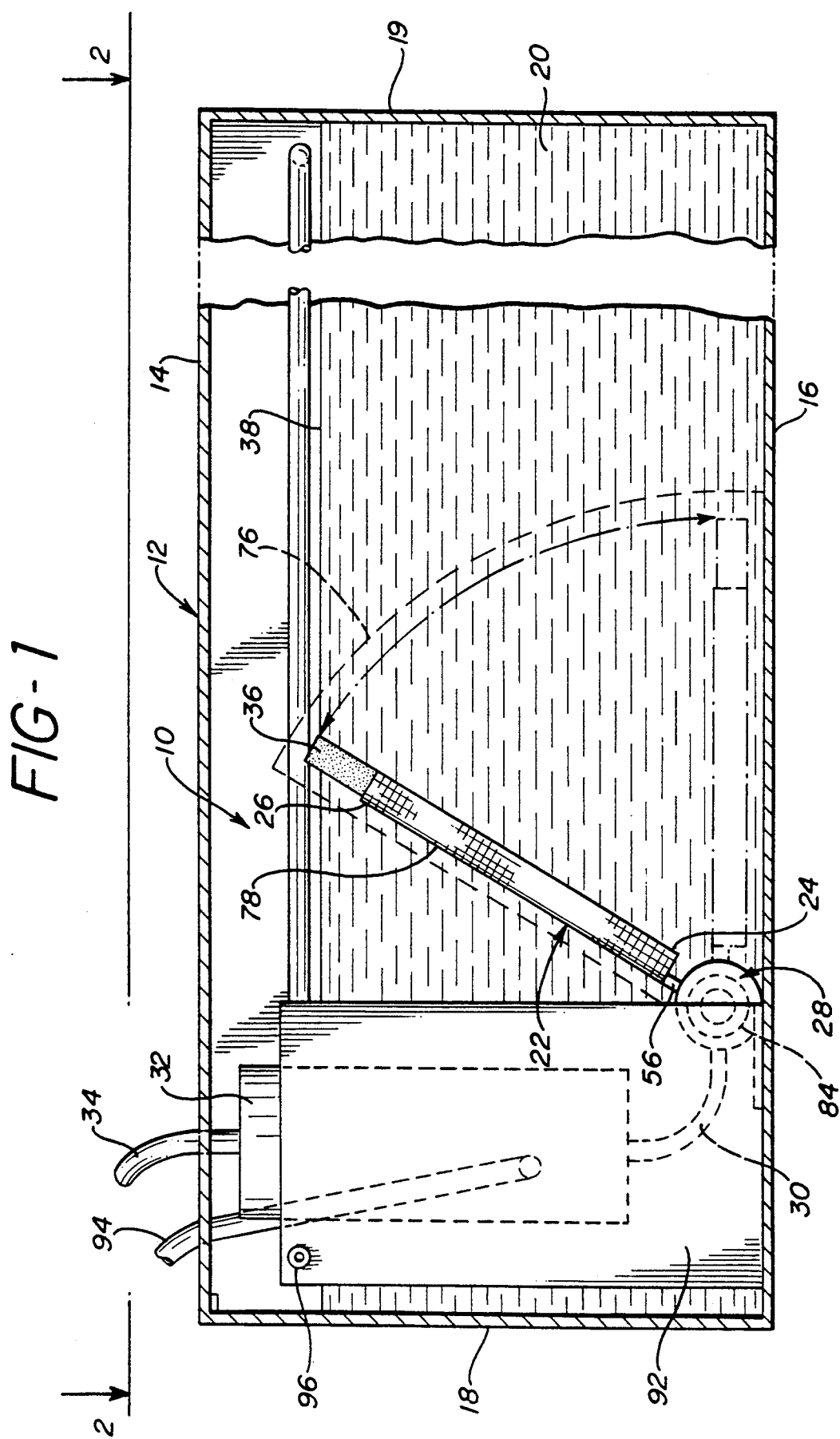
FIG. 1 is a side elevational view of the present homogenizing fuel delivery system shown inside of a vehicle fuel tank.
Figure 2:
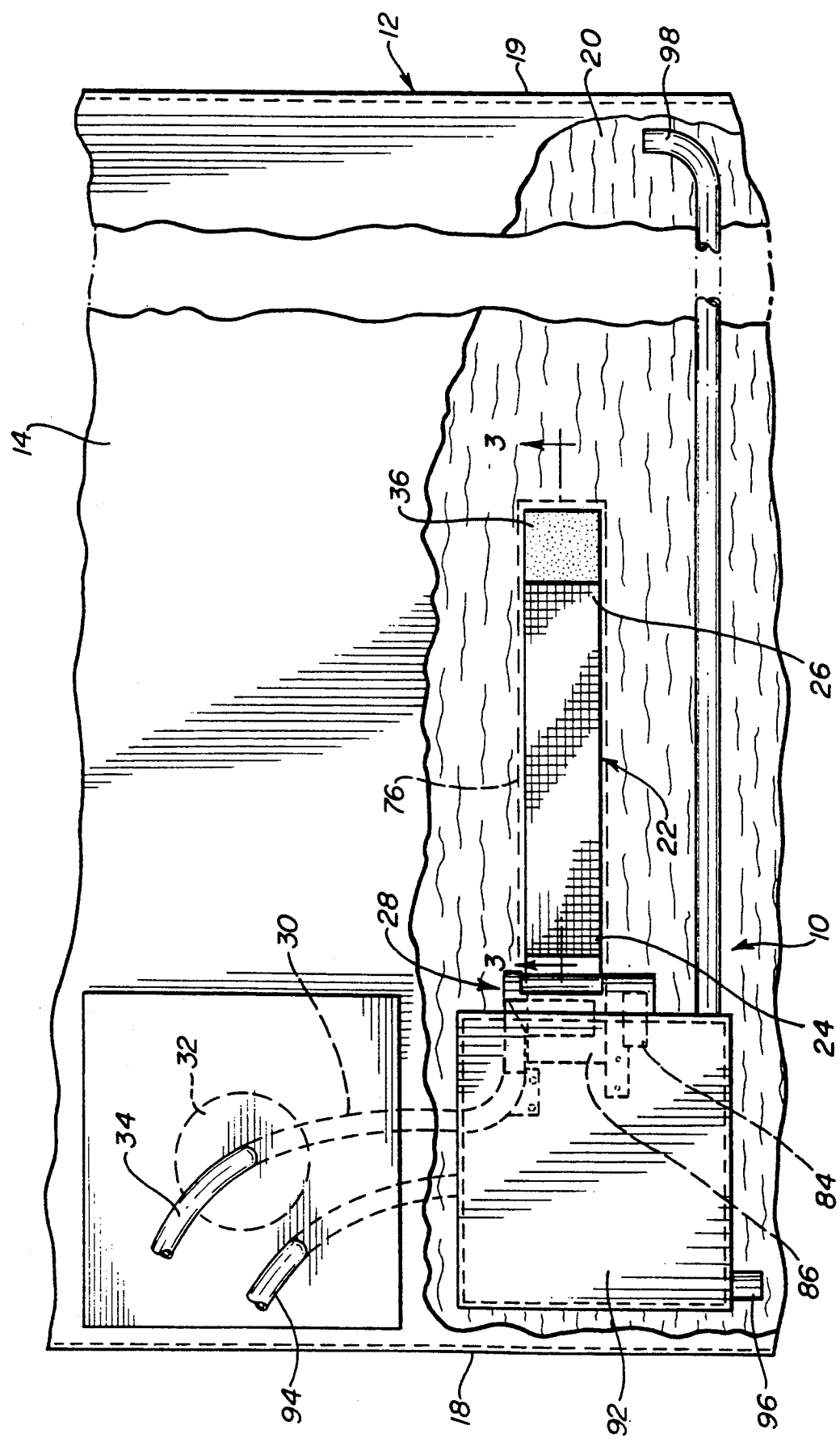
FIG. 2 is a top elevational view of the homogenizing fuel delivery system taken along lines 2—2 in FIG. 1.

Referring now to FIGS. 1 and 2, homogenizing fuel delivery system 10 is shown in fuel tank 12. Fuel tank 12 can be any type of fuel tank used in a motorized vehicle. Fuel tank 12 generally includes a top portion 14, bottom portion 16, and side portions 18 and 19 which define an internal chamber for containing fuel 20. Fuel 20 in fuel tank 12 is made up of a plurality of layers. "Layers" are defined herein as a series of vertically stacked, cross-sectional portions of a confined body of liquid which, in their entirety, define the entire body of liquid. There are no structural barriers dividing the "layers," the number of "layers" is arbitrary, and reference to "layers" in this specification is to aid in understanding the invention. In a fuel tank, each layer of fuel may or may not be of the same composition, depending upon the type of fuel, the physical environment of the fuel, and whether or not the fuel has been fully mixed.

If fuel 20 is of a type containing only one component, each layer will be of the same composition. On the other hand, if fuel 20 is a multicomponent fuel, such as one consisting of combinations of gasoline and methanol or ethanol, or one containing various fuel additives or water, the composition of each layer of fuel 20 in fuel tank 12 may or may not differ, depending on whether fuel 20 has been fully mixed. If fuel 20 is a multicomponent fuel and is fully mixed, such as when the vehicle's engine has been running for a significant period of time, the composition of each layer will generally be the same. However, if fuel 20 is a multicomponent fuel and is not fully mixed, such as when the vehicle has been stationary for an appreciable period or has recently been refueled with a fuel having a different composition from that of the fuel initially present in fuel tank 12, fuel 20 in fuel tank 12 may be stratified. When fuel 20 is stratified, different layers can differ in composition.

Homogenizing fuel delivery system 10 generally includes means for drawing fuel substantially equally from substantially all of the layers of fuel 20 contained within fuel tank 12. Such means include pivotal member 22 which has a first end 24 and a second end 26. First end 24 is pivotably mounted to rotary valve 28 which is, in turn, positioned inside of and attached to bottom surface 16 of fuel tank 12. As will be explained in more detail below, when there is an appreciable level of fuel in fuel tank 12, fuel 20 is drawn from fuel tank 12 by pivotal member 22, passes through rotary valve 28 and tubing section 30, and is sent to the vehicle engine (not shown) by fuel pump 32 via fuel line 34.

Mounted to second end 26 of pivotal member 22 is float 36. Float 36 is constructed of a material which is buoyant in any fuel which may be used with a motorized vehicle. In this manner, second end 26 is made to reside at the surface 38 of fuel 20 so that second end 26 continuously rises and falls with surface 38 as the level of fuel 20 in fuel tank 12 changes. Moreover, as second end 26 continuously rises and falls, pivotal member 22 continuously pivots about, and sends fuel through, rotary valve 28. As an alternative, float 36 could be made to pivot about a central pivot point attached to second end 26. As illustrated in FIG. 1, pivotal member 22 is capable of pivotal movement which ranges from the non-horizontal position shown in full lines when fuel tank 12 is full or nearly full, to the horizontal position shown in phantom lines when fuel tank 12 is empty or nearly empty.

Referring now to FIGS. 3 and 4, the structure and function of pivotal member 22 will be explained in greater detail. Disposed along substantially the entire length of bottom surface 40 of pivotal member 22 is a plurality of orifices, shown there as 42a-h. The number and spacing the orifices may be varied depending upon a number of factors such as the dimensions of the fuel tank and the length of the pivotal member. For purposes of this invention, each orifice will be deemed to correspond to a "layer" of fuel within tank 12 located generally in the same horizontal plane as the orifice. As can be seen, the number of "layers" of fuel, for purposes of this invention, corresponds to the number of orifices in pivotal member 22. Additionally, while the number of layers of fuel in the tank will always remain the same (except when pivotal member 22 is horizontal), the vertical spacing of the orifices will change as pivotal member 22 moves. Fuel 20 enters bottom surface 40 of pivotal member 22 through each of orifices 42a-h, as indicated by the arrows in FIG. 3.

Several features of pivotal member 22 allow the present homogenizing fuel delivery system to draw fuel 20 substantially equally from substantially all of the plurality of layers thereof contained within fuel tank 12. A first feature involves the orientation of orifices 42a-h with respect to the plurality of layers of fuel 20. Because float 36 causes second end 26 of pivotal member 22 to reside at the surface 38 of fuel 20, and because first end 24 of pivotal member 22 is mounted to rotary valve 28 which is, in turn, attached to bottom portion 16 of fuel tank 12, bottom surface 40 of pivotal member 22 can be exposed to every layer of fuel 20. In this manner, the number of orifices 42a-h disposed along bottom surface 40 can be chosen to allow portions from substantially each layer of fuel 20 to be drawn into pivotal member 22. The number of orifices shown in FIG. 1, eight, is a representative number only. A larger or smaller number could be used, depending on the design of the tank and internal hardware, and on the degree of homogenization required. Experimental determination of the requisite number of orifices is required.

As an alternative to providing a plurality of orifices through which to draw fuel, a thin slit extending along the entire length of the bottom surface 40 of pivotal member 22 could be employed in place of orifices 42a-h. Such a slit would simulate an infinite number of spaced orifices.

A second feature which allows the present system to draw fuel substantially equally from substantially all of the layers of fuel 20 in fuel tank 12 is the size of orifices 42a-h. Specifically, orifices 42a-h are sized such that the impedance to the flow of fuel therethrough is sufficiently large that the total pressure drop through pivotal member 22 will also be sufficiently large, compared to the difference in static fluid pressure between any two orifices, that fuel flow through each of orifices 42a-h is substantially equal. When an appreciable amount of fuel is present in fuel tank 12, pivotal member 22 will be in a non-horizontal position due to the buoyancy of float 36, as explained above. In this situation, each of orifices 42a-h will be at a different distance from the surface 38 of fuel 20. For this reason, the static fluid pressure at each orifice will be a different value, with the orifices closer to the bottom portion 16 of fuel tank 12 being exposed to a higher static fluid pressure than those closer to the surface 38. If no measures were taken to account for these differences, the flow rate through orifices 42a-d, which are closer to the bottom portion 16 of fuel tank 12, would be greater than that through orifices 42*e-h*, which are closer to the surface 38, since the total pressure differential across orifices 42*a-d* will be greater than the pressure differential across orifices 42*e-h*.

It has been found, however, that this flow imbalance due to the static pressure differential can be made acceptably small by increasing the impedance to the flow of fuel through orifices 42*a-h* while increasing the pressure which drives the flow. In this manner, the variations in static pressure can be made to be a small fraction of the total pressure driving the flow. The impedance to flow can be increased by decreasing the size of orifices 42*a-h*. In addition, the pressure which drives the flow of fuel can be increased by increasing the suction pressure of fuel pump 32. Both of these variables can be adjusted to achieve a flow imbalance due to the static fluid pressure differential which is acceptably low.

Alternatively, the size of orifices 42*a-h* can be varied with respect to one another. In comparing the flow between the two endmost orifices, 42*a* and 42*h*, when pivotal member 22 is most nearly vertical, if the holes are the same size and the static pressure differential due to head difference causes the total pressure drop across hole 42*a* to be 4% higher than the total pressure drop across hole 42*h*, the flow through hole 42*a* will be approximately 4% higher than the flow through hole 42*h*. If, instead, the area of hole 42*h* is made sufficiently larger than the area of hole *a* that the flows through these two orifices are equal when the tank fluid level is midway between full and empty, then the flow through orifice 42*h* will be within ±2% of the flow through orifice 42*a* as pivotal member 22 pivots throughout its range. Similarly, assuming the area of orifice 42*g* is increased enough above the area of orifice 42*b* so that these flows are equal when pivotal member 22 is at the mid-level position, the flow through orifice 42*g* would be within ±1.5% approximately, of the flow through orifice 42*b* since the head differential is reduced. The relationship between orifices 42*f* and 42*c* can be similarly treated to give approximately ±1% flow difference, while orifices 42*e* and 42*d* could yield approximately ±0.5% difference in flow.

A third feature for drawing fuel substantially equally from substantially all layers of fuel 20 from fuel tank 12 is a plurality of internal passages contained within pivotal member 22 through which fuel flows. As shown most clearly in FIG. 4, the internal passages are defined by side members 44 and 46 and by cross members 48, 50, 52, and 54. As shown in FIG. 3, each internal passage provides a path for fuel 20 to flow through the maze structure contained within pivotal member 22, beginning at one of orifices 42*a-h* and ending at outlet channel 56. Specifically, fuel which enters orifice 42*a* flows separately towards junction 58 where it meets fuel entering orifice 42*b*. Similarly, fuel entering orifices 42*c* and 42*d* meets at junction 60. Fuel from junctions 58 and 60 then meets at junction 62. At the other end of pivotal member 22, fuel from orifices 42*e* and 42*f* join at junction 64, fuel from orifices 42*g* and 42*h* join at junction 66, and fuel from junctions 64 and 66 join at junction 68. Finally, fuel from junctions 62 and 68 meets at outlet junction 70 and then flows out of pivotal member 22 through outlet channel 56 and into rotary valve 28.

The reason for the maze structure contained within pivotal member 22 is to equalize the lengths of each internal passage through which fuel drawn from each of orifices 42*a-h* flows. In this manner, fuel drawn from each of orifices 42*a-h* undergoes substantially the same pressure drop as it flows through pivotal member 22, thereby ensuring substantially equal fuel flow from each layer of fuel 20 in fuel tank 12.

Pivotal member 22 can be molded from fuel-impervious plastic with a first segment consisting of side member 44, top portion 72, and cross members 48, 50, 52, 54. A second segment, which includes side member 46, can then be attached to the first segment to complete assembly of pivotal member 22. Orifice plate 74, with more uniform orifice sizes than can be molded from plastic, can be attached to the underside of cross member 54.

As an alternative to providing the maze structure shown in FIG. 3, the inside of pivotal member 22 can be made hollow and the size of orifices 42*a-h* can be varied along the length of pivotal member 22 to equalize flow through each orifice from each layer of fuel 20 in fuel tank 12.

In addition to providing means for drawing fuel substantially equally from substantially all of the layers of fuel 20 contained within fuel tank 12, the present homogenizing fuel delivery system provides several other features. One feature, illustrated in FIGS. 1-4, provides means for minimizing air intake by pivotal member 22 to prevent air ingestion by the engine. Such means include perforated enclosure 76, which has a shape that substantially conforms to the pivotal volume occupied by pivotal member 22, as shown in FIG. 1. Perforated enclosure 76 is attached to bottom portion 16 of fuel tank 12 and surrounds pivotal member 22 throughout its entire angular range of motion. Preferably, perforated enclosure 76 is constructed of uniformly perforated metal to allow fuel to enter the enclosure uniformly. Perforated enclosure 76 minimizes air intake into pivotal member 22 by protecting pivotal member 22 from waves which develop on the surface 38 of fuel 20 when the vehicle is in motion.

Planar member 78 is also provided for minimizing air intake by pivotal member 22. As shown in FIGS. 3 and 4, planar member 78 is fixed to the top portion 72 of pivotal member 22 and has a planar surface area which exceeds that of the top portion 72 of pivotal member 22. In this manner, should any waves form on the portion of fuel 20 which is inside of perforated enclosure 76, planar member 78 is available to disperse such waves to thereby prevent the air/fuel interface from falling below any of orifices 42*a-h*.

Additional means for minimizing air intake by pivotal member 22 are illustrated in FIGS. 3 and 4 where filter 80 is shown interposed between orifices 42*a-h* and fuel 20. Preferably, filter 80 is a textile fabric made from polyvinylidene chloride. As is known, when polyvinylidene chloride is wetted with fuel, it prevents air and debris from passing through its weave. Thus, when filter 80 is wrapped around the outer surface of pivotal member 22, as shown, air, water, and debris are prevented from entering orifices 42*a-h*. To increase the surface area through which fuel will flow, a series of raised projections 82 are arranged along the bottom surface 40 of pivotal member 22 as shown. In this manner, when pivotal member 22 is in a horizontal or nearly horizontal position, clogging of orifices 42*a-h* from either debris accumulation or from contact with the bottom portion 16 of fuel tank 12 is less likely.

Another feature provided by the present homogenizing fuel delivery system is means for sensing the level of fuel 20 in fuel tank 12. Such means are illustrated in FIGS. 1 and 2 and most clearly in FIG. 5 where rotary potentiometer 84 is shown rotatably mounted to rotary valve 28 in such a manner that the resistance of rotary potentiometer 84 varies with the pivotal position of pivotal member 22. Preferably, rotary potentiometer 84 is a conductive film-type rotary potentiometer. As explained above, second end 26 of pivotal member 22 resides at the surface 38 of fuel 20 by virtue of float 36. Thus, the pivotal position of pivotal member 22 varies as the level of fuel 20 in fuel tank 12 changes. Furthermore, as will be explained in greater detail below, outer rotatable cylinder 86 of rotary valve 28 rotates with and to the same degree as the pivotal movement of pivotal member 22. Thus, the rotational position of outer rotary cylinder 86 provides a measure of the level of fuel 20 in fuel tank 12. Set screw 88 couples the rotational position of outer rotatable cylinder 86 with rotary potentiometer 84 via shaft 90. The variable electrical signal from rotary potentiometer 84 can then be sent to a properly calibrated fuel level gage or to an engine control computer.

Yet another feature provided by the present invention is means for causing circulation of fuel 20 in fuel tank 12 to thereby hasten the mixing of fuel 20. Thus, if fuel 20 is in a condition of stratification, this condition will thereby be eliminated. The circulation means are shown in FIGS. 1 and 2. When there is an appreciable level of fuel 20 in fuel tank 12, fuel will be drawn through pivotal member 22, passed through rotary valve 28 and tubing section 30, and sent to the vehicle engine by fuel pump 32 via fuel line 34. Any unused fuel will be returned, by force of fuel pump 32, to reservoir 92 via return line 94. When reservoir 92 is full, the excess returned fuel is ejected from reservoir 92 via exit pipes 96 and 98. As shown in FIG. 2, exit pipes 96 and 98 are positioned such that the fuel ejected from reservoir 92 enters fuel tank 12 substantially tangentially to side portions 18 and 19, respectfully. In this manner, fuel 20 is encouraged to circulate in the direction in which fuel is tangentially ejected from reservoir 92.

Certain conditions will temporarily cause an inadequate flow of fuel to be supplied to a vehicle engine. This generally occurs when a low level of fuel is present in a vehicle's fuel tank and the vehicle undergoes acceleration such as by rounding a corner, going uphill, or speeding up. With the present homogenizing fuel delivery system, vehicle acceleration under conditions of low fuel level in fuel tank 12 will cause the majority of fuel 20 to shift to one side or the other or to the front or to the rear of fuel tank 12. Under these conditions, the surface 38 of fuel 20 will temporarily be beneath certain portions of bottom surface 40 of pivotal member 22, thereby causing pivotal member 22 to pivot downwards to assume a horizontal or nearly horizontal position. Between the moment when fuel 20 first shifts and the moment when pivotal member 22 resumes drawing fuel from all of orifices 42a-h, a temporary lag in full fuel delivery to the vehicle engine will occur.

To prevent engine stall under such circumstances, the present invention provides means to avoid inadequate fuel flow to the engine. When pivotal member 22 assumes a horizontal or nearly horizontal position, such as when the level of fuel 20 in fuel tank 12 is low and the vehicle undergoes acceleration or when fuel tank 12 is empty, rotary valve 28 automatically draws fuel from reservoir 92. That is to say, rotary valve 28 draws fuel primarily from fuel tank 12 when pivotal member 22 is oriented in a generally non-horizontal position, such as when an appreciable amount of fuel is present in fuel tank 12, and draws fuel primarily from reservoir 92 when pivotal member 22 is oriented in a generally horizontal position.

In order to explain the means by which fuel draw is automatically switched from fuel tank 12 to reservoir 92, reference is now made to FIGS. 5-8 where rotary valve 28 is shown in greater detail. Rotary valve 28 includes outer rotatable cylinder 86 which, in turn, has a first opening 100 and a second opening 102. First opening 100 is attached to and is in fluid communication with outlet channel 56 of pivotal member 22. Second opening 102 is in fluid communication with reservoir 92. Inner fixed cylinder 104 is concentrically located inside of outer rotatable cylinder 86 in such a manner that outer rotatable cylinder 86 axially rotates about inner fixed cylinder 104. Inner fixed cylinder 104 has a large aperture 106 and a small aperture 108.

Figure 5:
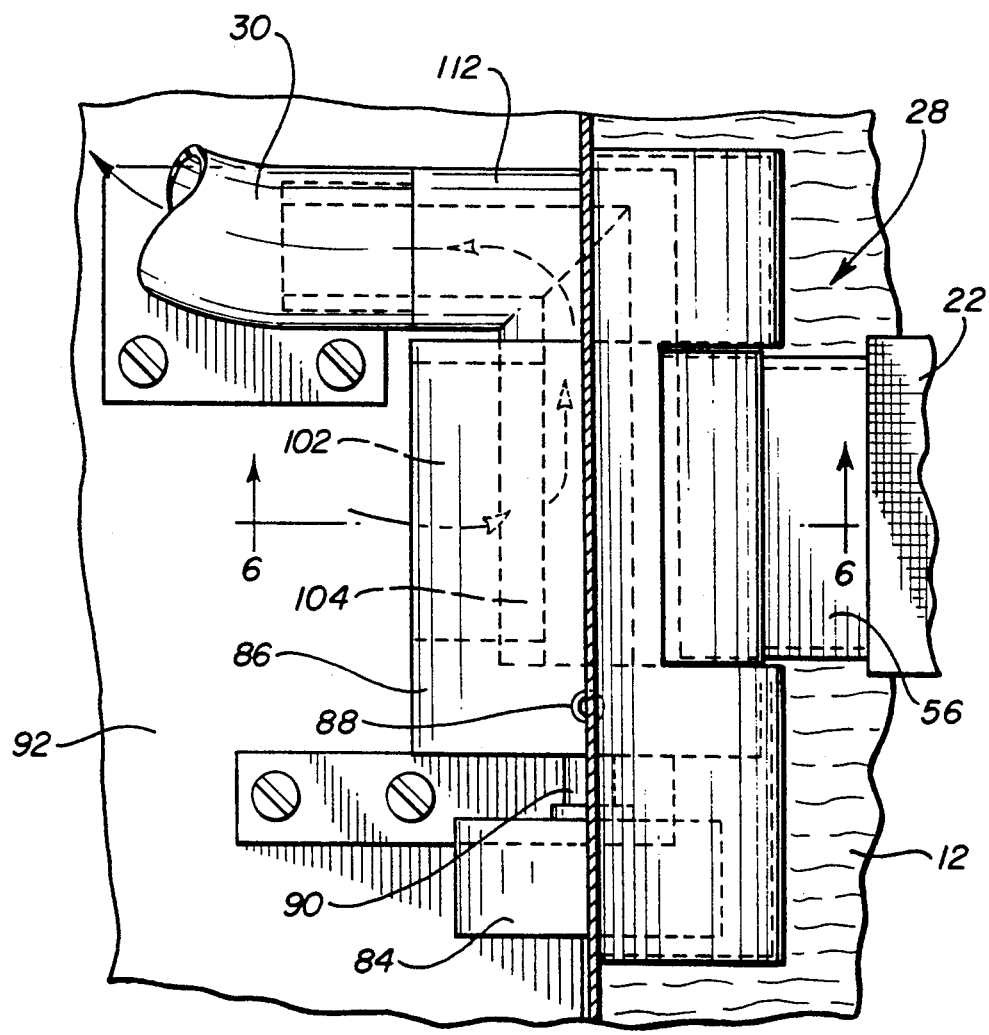
FIG. 5 is an enlarged view of the rotary valve shown in FIGS. 1 and 2 wherein the pivotal member is in a horizontal position.
Figure 6:
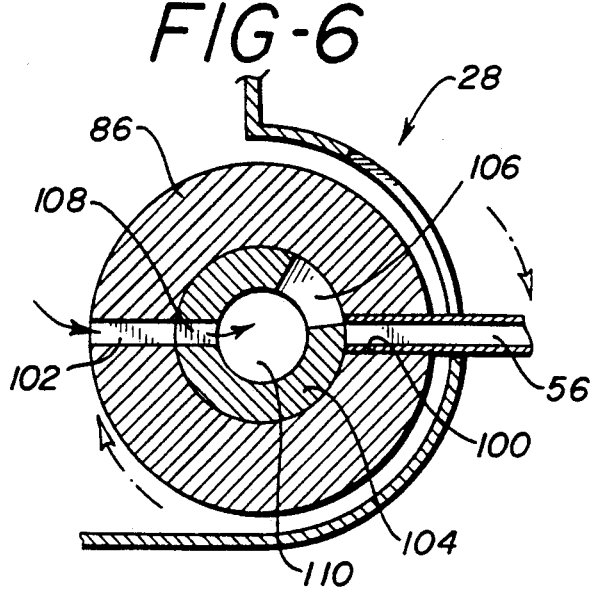
FIG. 6 is a cross sectional view of the rotary valve shown in FIG. 5 taken along lines 6—6.

Small aperture 108 is in fluid communication with second opening 102 in rotatable cylinder 86 only when pivotal member 22 is oriented in a generally horizontal position. This configuration is illustrated in FIGS. 5 and 6 where fuel is shown flowing from reservoir 92 into second opening 102 in outer rotary cylinder 86, and into small aperture 108 in inner fixed cylinder 104. From small aperture 108, the fuel enters exit passageway 110, which extends axially through inner fixed cylinder 104 and through outlet pipe 112, and flows into fuel pump 32 via tubing section 30. In this manner, an uninterrupted supply of fuel will be sent to the vehicle engine even though fuel tank 12 is empty or the level of fuel 20 in fuel tank 12 is low and the vehicle undergoes acceleration such that pivotal member 22 assumes a horizontal or nearly horizontal position.

Figure 7:
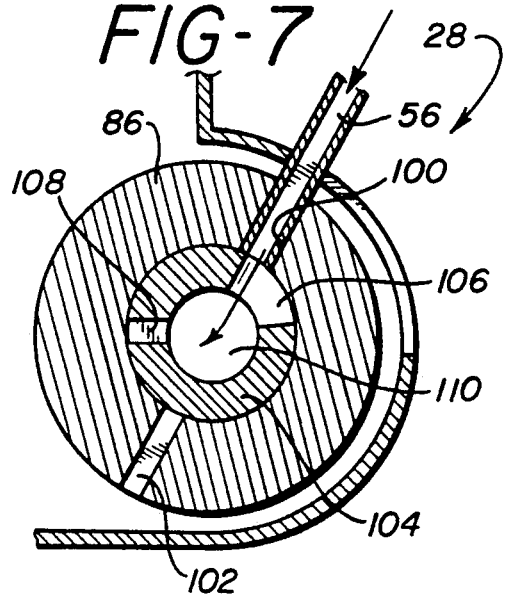
FIG. 7 is a cross sectional view of the rotary valve shown in FIG. 5 where the pivotal member is in a non-horizontal position.

The situation where an appreciable amount of fuel is present in fuel tank 12 such that pivotal member 22 is in a non-horizontal position is illustrated in FIG. 7. As shown, large aperture 106 is in fluid communication with first opening 100 in rotatable cylinder 86 only when pivotal member 22 is oriented in a generally non-horizontal position. In this configuration, fuel flows from fuel tank 12, through pivotal member 22 and outlet channel 56, into first opening 100 in outer rotatable cylinder 86 and into large aperture 106 in inner fixed cylinder 104, and through exit passageway 110 to fuel pump 32 via tubing section 30.

While representative embodiments and certain details have been shown for purposes of illustrating the invention, it will be apparent to those skilled in the art that various changes in the methods and apparatus disclosed herein may be made without departing from the scope of the invention, which is defined in the appended claims.

What is claimed is:

1. A homogenizing fuel delivery system for a motorized vehicle having an engine and a fuel tank, said fuel tank having top, bottom, and side portions defining an internal chamber for containing fuel, said fuel having a plurality of layers, said delivery system comprising:

means for drawing fuel substantially equally from substantially all of said plurality of layers of fuel contained within said fuel tank, said fuel drawing means including a pivotal member having a first end and a second end, said first end being pivotably mounted inside of said fuel tank, said second end having means for causing said second end to reside at the surface of said fuel in said fuel tank, said fuel drawing means further including a valve positioned inside of said fuel tank, said valve being in fluid communication with said fuel delivering means and with said pivotal member, said first end of said pivotal member being pivotably mounted to said valve, and said pivotal member having a top surface and a bottom surface, said bottom surface having means disposed along substantially the entire length thereof to draw fuel substantially equally from substantially all of said plurality of layers of fuel contained within said fuel tank;

means for delivering fuel from said fuel drawing means to said engine;

whereby, the fuel delivered to said engine has a composition which is substantially equal to the average composition of said fuel in said fuel tank.

2. A homogenizing fuel delivery system for a motorized vehicle having an engine and a fuel tank, said fuel tank having top, bottom, and side portions defining an internal chamber for containing fuel, said fuel having a plurality of layers, said delivery system comprising:

means for drawing fuel substantially equally from substantially all of said plurality of layers of fuel contained within said fuel tank, said fuel drawing means including a pivotal member having a first end and a second end, said first end being pivotably mounted inside of said fuel tank, said second end having means for causing said second end to reside at the surface of said fuel in said fuel tank, said fuel drawing means further including a valve positioned inside of said fuel tank, said valve being in fluid communication with said fuel delivering means and with said pivotal member, said first end of said pivotal member being pivotably mounted to said valve, and said pivotal member having a top surface and a bottom surface, said bottom surface having a plurality of orifices disposed along substantially the entire length thereof in order to draw fuel substantially equally from substantially all of said plurality of layers of fuel contained within said fuel tank; and means for delivering fuel from said fuel drawing means to said engine;

whereby, the fuel delivered to said engine has a composition which is substantially equal to the average composition of said fuel in said fuel tank.

3. The homogenizing fuel delivery system of claim 2 wherein said orifices are sized such that the impedance to the flow of fuel therethrough is sufficiently large that the total pressure drop through said pivotal member will also be sufficiently large, compared to the difference in static fluid pressure between any two said orifices, that fuel flow through each of said plurality of orifices is substantially equal.

4. The homogenizing fuel delivery system of claim 2 wherein said pivotal member further comprises a plurality of internal passages through which fuel flows, each of said internal passages being substantially equal in length and having a first end and a second end, said first end terminating at one of said plurality of orifices, and said second end terminating at a single outlet channel at which all said second ends of said internal passages terminate, said outlet channel being located at said first end of said pivotal member and being in fluid communication with said valve.

5. The homogenizing fuel delivery system of claim 2 further comprising means for minimizing air intake by said pivotal member.

6. The homogenizing fuel delivery system of claim 5 wherein said air intake minimization means comprises a filter interposed between said plurality of orifices and said fuel in said fuel tank.

7. The homogenizing fuel delivery system of claim 5 wherein said air intake minimization means comprises a perforated enclosure having a shape which substantially conforms to the pivotal volume occupied by said pivotal member in said fuel tank, said enclosure being positioned inside of said fuel tank such that said pivotal member is substantially surrounded by said enclosure.

8. The homogenizing fuel delivery system of claim 7 wherein said air intake minimization means further comprises a planar member fixed to said top surface of said pivotal member, said planar member having a planar surface area which exceeds that of said top surface of said pivotal member.

9. The homogenizing fuel delivery system of claim 2 further comprising means for sensing the level of fuel in said fuel tank.

10. The homogenizing fuel delivery system of claim 9 wherein said valve is a rotary valve and said fuel level sensing means comprises a rotary potentiometer mounted to said rotary valve such that the resistance of said rotary potentiometer varies with the pivotal position of said pivotal member.

11. The homogenizing fuel delivery system of claim 2 further comprising means for causing circulation of said fuel in said fuel tank.

12. The homogenizing fuel delivery system of claim 11 wherein said circulation means comprises:

a reservoir positioned inside of said fuel tank;

means for transporting fuel unused by said engine to said reservoir; and means for causing said returned fuel to be ejected from said reservoir when said reservoir is full, said ejected fuel entering said fuel tank substantially tangentially to said side portions thereof.

13. The homogenizing fuel delivery system of claim 12 further comprising means for avoiding inadequate fuel flow to said engine when said motorized vehicle undergoes acceleration.

14. The homogenizing fuel delivery system of claim 13 wherein said means to avoid inadequate fuel flow is provided by adapting said valve to draw fuel primarily from said fuel tank when said pivotal member is oriented in a generally non-horizontal position, and to draw fuel primarily from said reservoir when said pivotal member is oriented in a generally horizontal position.

15. The homogenizing fuel delivery system of claim 14 wherein said valve is a rotary valve and comprises:

a rotatable cylinder having a first opening and a second opening, said first opening being attached to and in fluid communication with said outlet channel of said pivotal member, said second opening being in fluid communication with said reservoir, said rotatable cylinder being made to rotate by the pivotal movement of said pivotal member;

a fixed cylinder substantially concentrically located inside of said rotatable cylinder such that said rotatable cylinder axially rotates about said fixed cylinder, said fixed cylinder having a large aperture and a small aperture, said large aperture being in fluid communication with said first opening in said rotatable cylinder when said pivotal member is oriented in a generally non-horizontal position, said small aperture being in fluid communication with said second opening in said rotatable cylinder when said pivotal member is oriented in a generally horizontal position; and an exit passageway extending axially through said fixed cylinder, said exit passageway being in fluid communication with said large aperture and said small aperture and also being in fluid communication with said means for delivering fuel from said fuel drawing means to said engine.

16. A homogenizing fuel delivery system for a motorized vehicle having an engine and a fuel tank, said fuel tank having top, bottom, and side portions defining an internal chamber for containing fuel, said fuel having a plurality of layers, said delivery system comprising:

means for drawing fuel substantially equally from substantially all of said plurality of layers of fuel contained within said fuel tank, said fuel drawing means further including a valve positioned inside of said fuel tank, said valve being in fluid communication with said fuel delivering means and with said pivotal member, said first end of said pivotal member being pivotably mounted to said valve, and said pivotal member having a top surface and a bottom surface, said bottom surface having means disposed along substantially the entire length thereof to draw fuel substantially equally from substantially all of said plurality of layers of fuel contained within said fuel tank;

means for delivering fuel from said fuel drawing means to said engine;

means for minimizing air intake by said fuel drawing means;

means for causing circulation of said fuel in said fuel tank;

means for avoiding inadequate fuel flow to said engine when said motorized vehicle undergoes acceleration; and means for sensing the level of fuel in said fuel tank.

17. A homogenizing fuel delivery system for a motorized vehicle having an engine and a fuel tank, said fuel tank having top, bottom, and side portions defining an internal chamber for containing fuel, said fuel having a plurality of layers, said delivery system comprising:

means for drawing fuel substantially equally from substantially all of said plurality of layers of fuel contained within said fuel tank, said fuel drawing means further including a rotary valve positioned inside of and mounted to said bottom of said fuel tank, said rotary valve being in fluid communication with means for transporting fuel from said rotary valve to said engine, a pivotal member in fluid communication with said rotary valve and having a first end and a second end, said first end being pivotably mounted to said rotary valve, said pivotal member having a top surface and a bottom surface with a plurality of orifices disposed along substantially the entire length of said bottom surface in order to draw fuel substantially equally from substantially all of said plurality of layers of fuel contained within said fuel tank, and means for causing said second end of said pivotal member to reside at the surface level of fuel in said main fuel tank;

means for delivering fuel from said fuel drawing means to said engine;

means for minimizing air intake by said fuel drawing means;

means for causing circulation of said fuel in said fuel tank;

means for avoiding inadequate fuel flow to said engine when said motorized vehicle undergoes acceleration; and means for sensing the level of fuel in said fuel tank.

18. The motorized vehicle of claim 17 wherein said orifices are sized such that the dynamic pressure drop of fuel flowing therethrough is sufficiently larger than the difference in static fluid pressure between any two said orifices that fuel flow through each of said plurality of orifices is substantially equal.

19. The motorized vehicle of claim 17 wherein said pivotal member further comprises a plurality of internal passages through which fuel flows, each of said internal passages being substantially equal in length and having a first end and a second end, said first end terminating at one of said plurality of orifices, and said second end terminating at a single outlet channel at which all said second ends of said internal passages terminate, said outlet channel being located at said first end of said pivotal member and being in fluid communication with said rotary valve.

20. A homogenizing fuel delivery system for a motorized vehicle having an engine and a fuel tank, said fuel tank having top, bottom, and side portions defining an internal chamber for containing fuel, said fuel having a plurality of layers, said delivery system comprising:

a rotary valve positioned inside of and mounted to said bottom portion of said fuel tank;

a pivotal member, said pivotal member including:
   a first end and a second end, said first end being pivotably mounted to said rotary valve and being in fluid communication therewith,
   a bottom surface having a plurality of orifices disposed along substantially the entire length of said bottom surface, said orifices being made sufficiently small so that the dynamic pressure drop of fuel flowing therethrough is sufficiently larger than the difference in static fluid pressure between any two said orifices that fuel flow through each of said plurality of orifices is substantially equal, and
   a plurality of internal passages through which fuel flows, each of said internal passages being substantially equal in flow impedance and having a first end and a second end, said first end terminating at one of said plurality of orifices, and said second end terminating at a single outlet channel at which all said second ends of said internal passages terminate, said outlet channel being located at said first end of said pivotal member and being in fluid communication with said rotary valve;

means for causing said second end of said pivotal member to reside at the surface level of said fuel in said fuel tank;

a fuel level sensing means comprising a rotary potentiometer mounted to said rotary valve such that the resistance of said rotary potentiometer varies with the pivotal position of said pivotal member;

a reservoir positioned inside of said fuel tank;

means for transporting fuel unused by said engine to said reservoir; and means for causing said returned fuel to be ejected from said reservoir when said reservoir is full, said ejected fuel entering said fuel tank substantially tangentially;

means to avoid inadequate fuel flow, said means provided by adapting said rotary valve to draw fuel primarily from said fuel tank when said pivotal member is oriented in a generally non-horizontal position, and adapted to draw fuel primarily from said reserve fuel tank when said pivotal member is oriented in a generally horizontal position;

means for transporting fuel from said rotary valve to said engine.

* * * * *